(12) United States Patent
Tabti

(10) Patent No.: US 10,317,543 B2
(45) Date of Patent: Jun. 11, 2019

(54) ESTIMATION OF A FAR FIELD SIGNATURE IN A SECOND DIRECTION FROM A FAR FIELD SIGNATURE IN A FIRST DIRECTION

(71) Applicant: PGS Geophysical AS, Oslo (NO)

(72) Inventor: Hocine Tabti, Oslo (NO)

(73) Assignee: PGS Geophysical AS, Oslo (NO)

( * ) Notice: Subject to any disclaimer, the term of this patent is extended or adjusted under 35 U.S.C. 154(b) by 883 days.

(21) Appl. No.: 14/538,651

(22) Filed: Nov. 11, 2014

(65) Prior Publication Data

US 2015/0293244 A1 Oct. 15, 2015

Related U.S. Application Data

(60) Provisional application No. 61/979,176, filed on Apr. 14, 2014.

(51) Int. Cl.
*G01V 1/00* (2006.01)

(52) U.S. Cl.
CPC .................... *G01V 1/006* (2013.01)

(58) Field of Classification Search
None
See application file for complete search history.

(56) References Cited

U.S. PATENT DOCUMENTS

| | | | |
|---|---|---|---|
| 4,476,553 A | 10/1984 | Ziolkowski et al. | |
| 4,868,794 A | 9/1989 | Ziolkowski et al. | |
| 5,384,752 A | 1/1995 | Duren et al. | |
| 6,081,765 A | 6/2000 | Ziolkowski | |
| 7,218,572 B2 * | 5/2007 | Parkes | G01V 1/006 181/118 |
| 8,600,680 B2 | 12/2013 | Parkes et al. | |
| 2006/0256658 A1 * | 11/2006 | Christie | G01V 1/364 367/43 |
| 2013/0201791 A1 | 8/2013 | Parkes et al. | |
| 2013/0322208 A1 | 12/2013 | Sollner et al. | |
| 2013/0325427 A1 | 12/2013 | Hegna et al. | |

OTHER PUBLICATIONS

Ziolkowski, "Why don't we measure seismic signatures?" Geophysics, vol. 56, No. 2, Feb. 1991, pp. 190-201.
Ziolkowski, "The determination of the far-field signature of an interacting array of marine seismic sources from near-field measurements—results from the Delft Air Gun Experiment," First Break, vol. 25, Feb. 2007, pp. 88-102.
TechLink, GeoStreamer GS™—The Ghost Free Solution, vol. 11, No. 4, May 2011, 4 pp.
TechLink, "Far-field Measurement Program to Extend our NUCLEUS Source Modeling Capabilities," vol. 6, No. 13, Dec. 2006, 4 pp.

* cited by examiner

*Primary Examiner* — Shaun M Campbell

(57) ABSTRACT

The present disclosure is related to estimation of a far field signature in a second direction from a far field signature in a first direction. For a number of source elements, where the number of source elements corresponds to a seismic source, an impulse response in a first direction and a second direction can be determined. A transfer function that transforms a far field signature of the seismic source in the first direction to a far field signature of the seismic source in the second direction can be determined based on corresponding impulse responses in the first direction and the second direction. An estimated far field signature for the seismic source in the second direction can be determined based on the transfer function.

24 Claims, 10 Drawing Sheets

ESTIMATION OF A FAR FIELD SIGNATURE IN A SECOND DIRECTION FROM A FAR FIELD SIGNATURE IN A FIRST DIRECTION

CROSS-REFERENCE TO RELATED APPLICATIONS

This application claims priority to U.S. Provisional Application 61/979,176, filed Apr. 14, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine seismic survey vessel tows one or more seismic sources below the surface of the water and over a subterranean formation to be surveyed for mineral deposits. Seismic receivers may be located on or near the seafloor, on one or more streamers towed by the source vessel, or on one or more streamers towed by another vessel. The source vessel typically contains marine seismic survey equipment, such as navigation control, seismic source control, seismic receiver control, and recording equipment.

The seismic source control may cause the one or more seismic sources, which can be air guns, marine vibrators, among other sources described herein, to produce acoustic signals at selected times. Each acoustic signal is essentially a sound wave that travels through the water and into subterranean formations. At each interface between different types of rock or other subterranean material, a portion of the sound wave may be refracted, a portion of the sound wave may be transmitted, and another portion may be reflected back toward the body of water to propagate toward the surface. The seismic receivers thereby measure a wavefield that was ultimately initiated by the actuation of the seismic source. Planning and executing a marine seismic survey and processing the acquired data require an accurate model of the output wavefield of the seismic sources used in the marine seismic survey.

DETAILED DESCRIPTION

Figure 1:
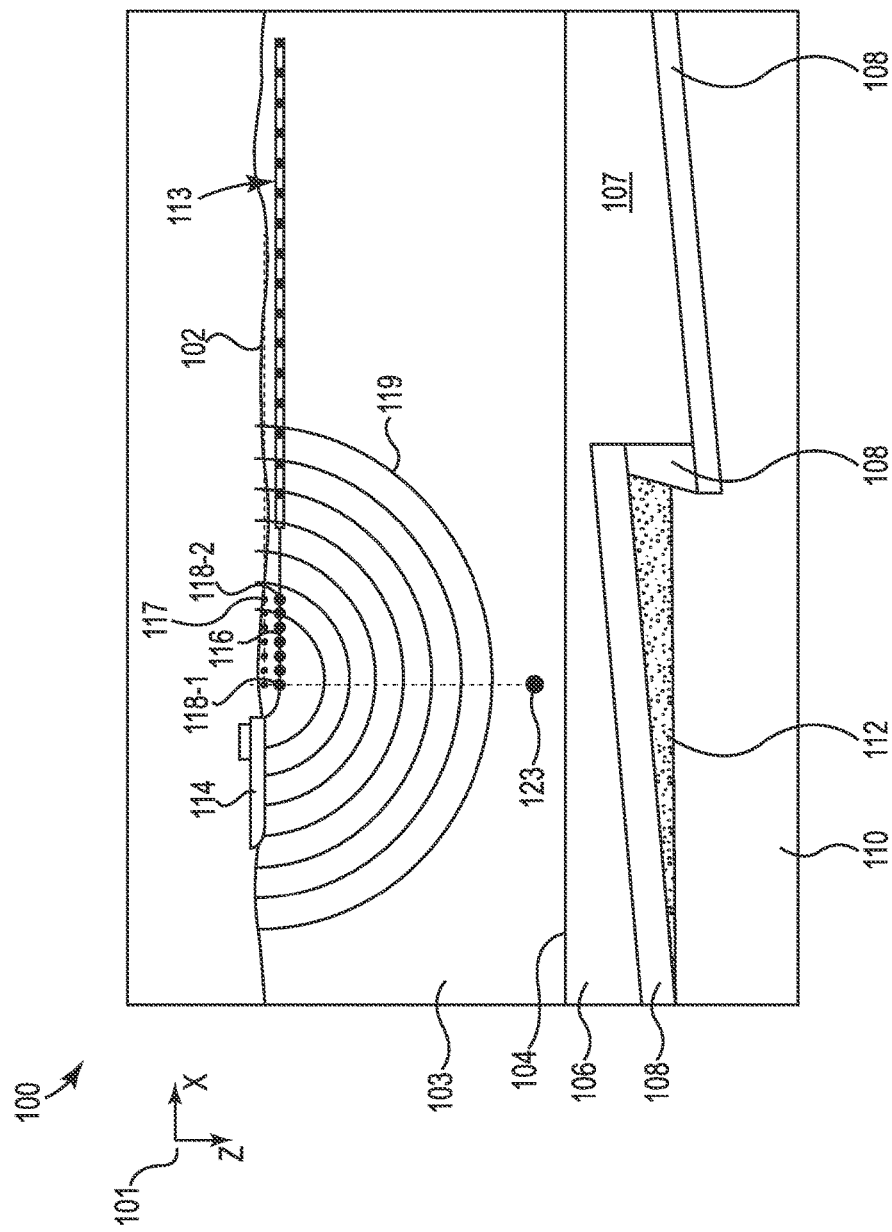
FIG. 1 illustrates marine seismic surveying in which acoustic signals are emitted by a seismic source for recording by seismic receivers and subsequent processing and analysis to characterize the structures and distributions of features and materials underlying a solid surface of the earth.

The present disclosure is related to estimation of a far field signature of a seismic source in a second direction from a far field signature of the seismic source in a first direction. A source of an acoustic signal can emit a wavefield and, as described herein, can be termed a "seismic source". Such seismic sources can include one or more seismic source elements, such as air guns, water guns, explosive devices, and/or vibratory devices, among others. In theory, the wavefield emitted by a point source can be described by a one-dimensional "signature" because a point source emits the same wavefield in all directions. A "notional source element signature" is a three-dimensional wavefield emitted by one source element, often approximated as a point source. The superposition of notional source element signatures from all of the source elements in a source array results in the "source signature." Thus, a source signature is a net three-dimensional pressure variation in a body of water as a function of time caused by a transient perturbation of pressure by the acoustic signal, an "impulse" or wavefield, from the actual submerged source.

As used herein, an "estimation of a far field signature" is a representation of what a measured far field signature would be in a direction and location where it is not known or measured, the estimation being based at least in part on a known or measured far field signature in at least one other direction and known relative positions of a number of source elements that in combination form a seismic source. As used herein, a "seismic source" can represent a single source element or a plurality of source elements arranged at known positions relative to each other in a source array. As used herein, a "source element" represents one of the sound-emitting devices (e.g., air guns, water guns, explosive devices, and/or vibratory devices) composing the seismic source. If not otherwise stated, the terms "source" and "source array" represent the same entity and refer to the cluster of source elements whose combined output of acoustic signals composes a total wavefield emitted from the corresponding source or source array.

As used herein, the measured far field signature or estimated far field signature are acoustic signals that arrive directly from a source to a far field measurement point or would arrive directly from the source to a simulated far field measurement point. As such, the signals arrive at the far field measurement point or would arrive at the simulated far field measurement point without reflecting off of a free surface, a solid surface, and/or a subsurface associated with a fluid volume of water.

One characteristic of a seismic source is its far field signature. A signature of a seismic source refers to a shape of the signal transmitted by the seismic source as recorded by a seismic receiver. The signature of the seismic source varies with direction and with distance from the seismic source. Along a given direction, this signature varies with increasing distance from the seismic source, until at some given distance the shape of the signature achieves a relatively stable shape. At greater distances than this given distance, the signature remains relatively unchanged. The region where the signature shape does not change substantially with distance in all directions is known as the far field region and the seismic signature measured or estimated within that region is known as the far field signature of the seismic source. Often the far field region will be greater than 100 meters from the source, and 200 meters from the source will be in the far field region in most instances. The far field signature of a source array having more than one source element separated in space may vary with direction. For instance, in comparison to a first far field signature measured vertically (e.g., in-line with gravitational pull) under the geometric center of the source array, a second far field signature can vary notably when measured at a 30 degree angle (30°) offset from vertical under the center of the seismic source. The center of the seismic source can be calculated as a geometric center reference point determined from the outermost edges of the most distal source elements in one, two, or three dimensions, depending on the configuration of the source array.

Estimating a far field signature from a seismic source at a location where there may not be a seismic receiver can be beneficial, as described in more detail below. According to some embodiments of the present disclosure, for a seismic source including a number of source elements, an impulse response can be determined in a first direction and a second direction. A transfer function that transforms a far field signature of the seismic source in a first direction to a far field signature of the seismic source in a second direction can be determined based on the corresponding impulse responses in the first direction and the second direction. An estimated far field signature for the seismic source in the second direction then can be determined based on the transfer function.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more". Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

This disclosure is related generally to the field of marine geophysical surveying. For example, this disclosure may have applications in marine seismic surveying, in which one or more towed sources are used to generate wavefields, where seismic receivers (e.g., towed and/or on or near an ocean bottom) can receive direct seismic energy generated by the seismic sources and/or as affected by interaction with subsurface formations. In the present disclosure, such a seismic receiver can be at a far field measurement point to directly receive, detect, and/or measure the seismic energy of the wavefield generated by the seismic source.

FIG. 1 illustrates marine seismic surveying in which acoustic signals are emitted by a seismic source for recording by seismic receivers and subsequent processing and analysis to aid in characterizing the structures and distributions of features and materials underlying a solid surface of the earth. FIG. 1 shows a domain volume 100 of the earth's surface. FIG. 1 includes a Cartesian coordinate system 101 used to specify coordinate locations within the domain volume 100 with respect to three orthogonal, spatial coordinate axes x, y and z. The x coordinate uniquely specifies the position of a point in a direction substantially parallel to a front of the domain volume 100 and substantially parallel to a free surface 102 of the domain volume 100. The y coordinate, although not shown due to the two-dimensional representation in FIG. 1, uniquely specifies the position of a point in a direction perpendicular to the x axis and substantially parallel to the free surface 102. The z coordinate uniquely specifies the position of a point perpendicular to an xy plane of the domain volume 100.

The domain volume 100 includes a solid volume 106 of sediment and rock below a solid surface 104 of the earth that, in turn, underlies a fluid volume 103 of water having the free surface 102, for instance, within an ocean, an inlet or bay, or a large freshwater lake. The domain volume 100 shown in FIG. 1 represents an example experimental domain for a class of observational and analytical techniques and systems referred to as marine seismic surveying.

FIG. 1 shows subsurface features of a subterranean formation in the lower portion of the domain volume 100. While the fluid volume 103 can be explored, analyzed, and characterized with relative precision using many different types of methods and probes, including remote-sensing submersibles, sonar, and other such devices and methods, the solid volume 106 underlying the fluid volume 103 is comparatively more difficult to probe and/or characterize. Compared to the overlying fluid volume 103, the solid volume 106 is significantly more heterogeneous and anisotropic, and includes many different types of features and materials of interest to marine surveying seismologists. For example, as shown in FIG. 1, the solid volume 106 may include a first sediment layer 107, a fractured and uplifted first rock layer 108, and an underlying second rock layer 110 below the first rock layer 108. In certain cases, the second rock layer 110 may be porous and contain a significant concentration of liquid hydrocarbon that is less dense than the second-rock-layer material and that, therefore, rises upward within the second rock layer 110. In the case shown in FIG. 1, the first rock layer 108 is not porous and, therefore, forms a lid that prevents further upward migration of the liquid hydrocarbon, which therefore pools in a hydrocarbon-saturated layer 112 below the first rock layer 108. One goal of marine seismic surveying is to identify likely locations of hydrocarbon-saturated porous strata within volumes of the earth's crust underlying the solid surface of the earth.

FIG. 1 shows an example of a marine seismic survey vessel 114 equipped to carry out a series of marine seismic data acquisitions. In particular, the vessel 114 can tow one or more seismic source 116, each of which can include a number of source elements, for example, as shown at 118-1 and 118-2, a number of meters below the free surface 102. In some situations, a seismic source can be towed across an approximately constant-depth plane below the free surface, although the depth can be varied as desired. The vessel 114 tows the seismic source 116 that produces pressure impulses at spatial and temporal intervals as the vessel 114 towing the seismic source 116 moves across the free surface 102. The seismic source 116 can include cables containing power and data-transmission lines to which the source elements 118-1, 118-2 are connected at regular or varied intervals. The seismic source 116 and the vessel 114 can include sophisticated control electronics and/or data-processing facilities.

In various embodiments, a plurality of source elements and/or seismic sources can be configured to form a one-dimensional, two-dimensional, or three-dimensional array, which can be considered as a single seismic source. In some embodiments, a plurality of source elements 118-1, 118-2 can be defined as a source array by being arranged in a one-dimensional, two-dimensional, or three-dimensional configuration.

In FIG. 1, the source elements 118-1, 118-2 are shown to lie below the free surface 102, with the source element positions correlated with overlying surface positions, such as a surface position 117 correlated with the position of source element 118-2. In various embodiments, sources may be otherwise disposed in the fluid volume 103.

Distal to the seismic source 116, FIG. 1 shows a streamer 113 below the surface of the free surface 102 that includes a number of seismic receivers for detection of the portion of the sound wave emitted by a seismic source that is reflected back toward the surface. The seismic receivers in the streamer 113 thereby aid in characterizing the structures and distributions of features and materials underlying a solid surface of the earth.

FIG. 1 shows a two-dimensional representation of an expanding, spherical acoustic wavefront, represented by semicircles of increasing radius centered at the source element 118-1, such as semicircle 119, following a seismic impulse emitted by the source element 118-1. The wavefronts are, in effect, shown in a vertical plane cross section in FIG. 1. The outward and downward expanding acoustic wavefield shown in FIG. 1 can eventually reach the solid surface 104, at which point the outward and downward expanding acoustic waves can partially reflect from the solid surface 104 and partially refract downward into the solid volume 106, becoming elastic waves within the solid volume. In other words, in the fluid volume 103, the waves are compressional pressure waves, or P-waves, the propagation of which can be modeled by an acoustic-wave equation. In the solid volume 106, the waves can include both P-waves and transverse waves, or S-waves, the propagation of which can be modeled by an elastic-wave equation. Within the solid volume 106, at each interface between different types of materials, at discontinuities in density, and/or in one or more of various other physical characteristics or parameters, downward propagating waves can be partially reflected and partially refracted, as at solid surface 104. As a result, each point of a solid surface and within the underlying solid volume 106 can become a potential secondary source from which acoustic and elastic waves, respectively, may emanate upward toward seismic receivers in the streamer 113 in response to the wavefield emitted by the source element 118-1 and downward-propagating elastic waves resulting from the transmitted impulse.

In addition, as described further herein, a far field signature contributed to by each of the output impulses from the source elements 118-1, 118-2 of the seismic source 116 can be directly measured by a seismic receiver 123 positioned at a far field measurement point that records pressure variation over a period of time. As described herein, the position of the seismic receiver 123 is not limited to being directly under a source element and/or a center of a seismic source. That is, the seismic receiver 123 can be positioned at various offset angles relative to the source element and/or a center of a seismic source.

Figure 2:
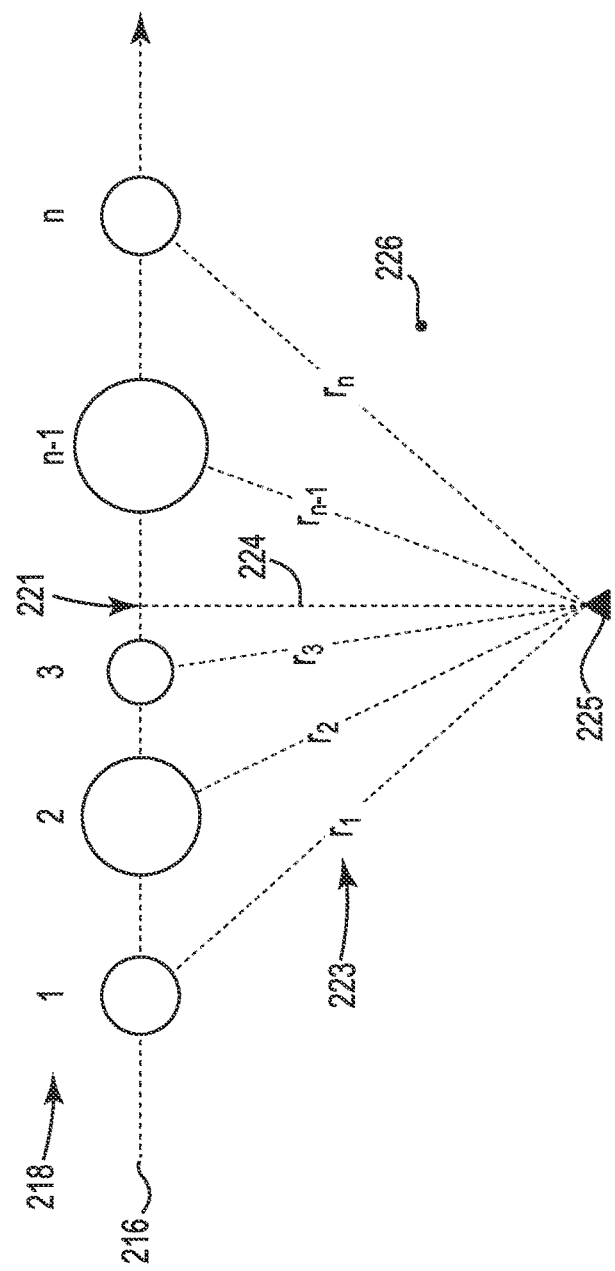
FIG. 2 illustrates a two-dimensional schematic representation of a source array and a far field measurement point.

FIG. 2 illustrates a two-dimensional schematic representation of a source array and a far field measurement point. The two-dimensional representation shows a schematic representation of a number of source elements 218. The number of source elements 218, as described herein, is not limited to a particular number, as indicated by the source elements being numbered as 218-1, 2, 3, . . . , n−1, and n. As described herein, the source elements 218 can be arranged in a source array 216. As shown in FIG. 2 in a one-dimensional arrangement, the source array 216 can have a source array center 221. The source array center 221 can have its position determined as the geometrical center of the source array 216. For example, the source array center 221 of the one-dimensional source array 216 shown in FIG. 2 can be determined as the position of a midpoint between an edge of source element 218-1 that is farthest to the left and an edge of source element 218-n that is farthest to the right of the source array center 221. As will be appreciated, geometric centers of two-dimensional and three-dimensional arrays can be similarly determined. The different sizes of the circles representing the source elements 218 in the source array 216 are proportional to different relative amplitudes of output impulses, as described further herein, produced by each source element, although some of the plurality of the source elements may produce the same or nearly the same amplitude of output impulse. In the illustrated example, source element 218-1 and source element 218-n have circles—representing amplitude—of similar size.

As shown in the two-dimensional representation in FIG. 2, the far field signature contributed to by each of the output impulses from the source elements 218 can be directly measured at a far field measurement point 225 by a seismic receiver, for instance, as shown by seismic receiver 123 in FIG. 1, that records pressure variation over a period of time. As shown, the position of each source element 218 in the source array 216 results in a variable corresponding distance 223-$r_1$, $r_2$, $r_3$, . . . , $r_{n-1}$, $r_n$ from the source element 218-1, 2, 3, . . . , n−1, n to the far field measurement point 225. As shown in FIG. 2, each of corresponding distances 223 can be longer than a distance 224 from the source array center 221 to the far field measurement point 225 when the far field measurement point 225 is positioned directly under the source array center 221. Hence, a wavefield emitted at the same time or nearly the same time by each of the source elements 218 would take varying lengths of time relative to each other to reach the far field measurement point 225. Likewise, the travel time of wavefields emitted by each of the source elements 218 would differs relative to a hypothetical wavefield emitted from the source array center 221, given a known acoustic wave velocity in the water between the source array 216 and the far field measurement point 225.

Although in the description provided herein the measured far field signature is determined in the vertical direction, the vertical far field signature being commonly determined in practice, the measured far field signature can be measured from a far field measurement point in any other known direction, for instance from hypothetical far field measurement point 226, and the calculations presented herein are equally valid. In various implementations, the far field signature measurement can be a direct recording of the source signature at some distance from the source, extracted from multi-channel seismic recordings, calculated and/or inferred from indirect near field measurements, or a combination of these implementations, among others.

The measured far field signature can be expressed as a linear superposition of so-called notional source element signatures from the n source elements in the source array 216, as shown in FIG. 2. As such, the measured far field signature can be determined as follows in equation 1:

$$FFS_{measured} = \frac{1}{4\pi} \sum_{j=1}^{n} \frac{1}{r_j} \cdot s_j\left(t - \frac{r_j}{v}\right) \quad (1)$$

Where $s_j$ is the notional source element signature in time t from source element number j in the source array 216, $r_j$ is the distance from source element j to the far field measurement point 225 and v is the acoustic wave velocity in the water between the source array 216 and the far field measurement point 225.

Figure 3:
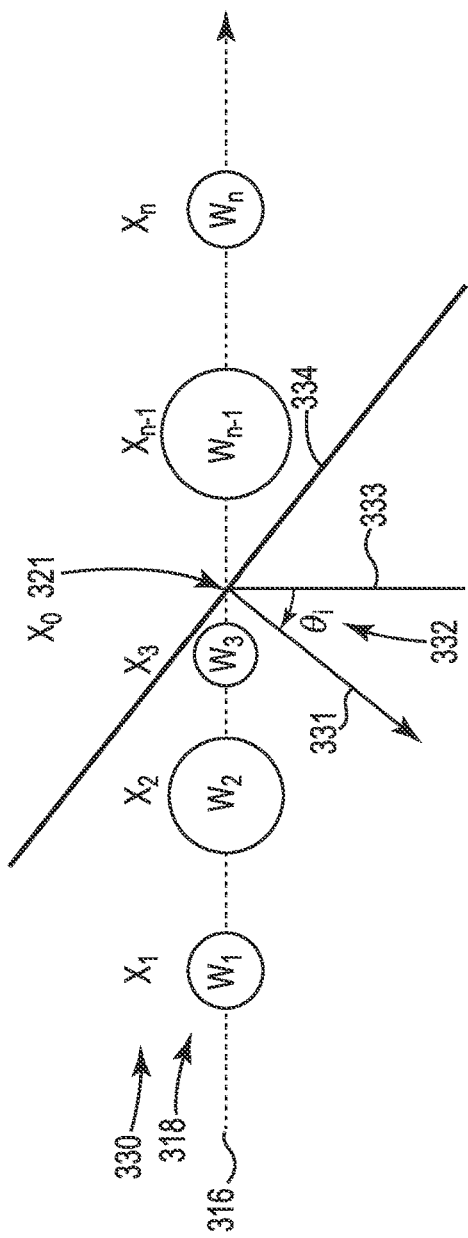
FIG. 3 illustrates a two-dimensional schematic representation of a plane wave emitted at a given angle relative to a line between a center of the source array and the far field measurement point.

FIG. 3 illustrates a two-dimensional schematic representation of a plane wave emitted at a given angle relative to a line between a center of the source array and the far field measurement point. As described herein, it may be desirable to estimate a far field signature signal at a location that does not correspond to a seismic receiver (e.g., at a location where there is no seismic receiver). An example of such a location where there may not be a seismic receiver (or where a seismic receiver is not intended to make far field signature signal detection) is a location that is not directly under the source array center 221 where placement of a seismic receiver, for instance as shown at 226 in FIG. 2, may be impractical and/or costly. As such, estimating a far field signature of a down-going wavefield, for example, as hypothetically measured at a simulated far field measurement point that is not directly under the source array, in lieu of measuring it directly, can provide valuable information regarding the characteristics of the down-going wavefield. Hence, it is useful to derive a far field signature at a different angle from the source array center 221 than the angle used for calculation of the measured far field signature.

Similar to FIG. 2, FIG. 3 shows a source array 316 of source elements 318. As described with regard to FIG. 2, the different sizes of the circles representing the source elements 318 in the source array 316 are proportional to corresponding relative output amplitudes. A weighting factor $w_1$, $w_2$, $w_3$, ..., $w_{n-1}$, $w_n$ is attributed to the output of each source element, as described further herein. Predetermined weighting factors, that is, "weights", attributed to each source element are used in calculation of an impulse response in a given direction produced by the source array 316, as described herein with regard to equation 2. The position of each source element 330 can be determined relative to an arbitrary origin on an x axis, for example, position $x_0$ at the source array center 321, where $x_0$=0, and/or a geometric center. A position 330-$x_1$, $x_2$, $x_3$, ... $x_{n-1}$, $x_n$ of each source element 318 is shown in FIG. 3. Although a one-dimensional source array is shown in FIG. 3, it will be appreciated that positions of source elements relative to positions of geometric centers of two-dimensional and three-dimensional source arrays can be similarly determined.

In various situations, it may be useful to determine an estimated far field signature in a second direction that differs from a first direction used for a measured far field signature. For example, as represented in two dimensions in FIG. 3, one can determine, as described herein, an estimated far field signature in a particular direction 331 that is offset at a particular desired angle 332, denoted as $\theta_i$, relative to the direction of the measured far field signature 333.

Multiple source elements in a source array can each produce an impulse substantially simultaneously to create multiple overlapping wavefields. However, in practical applications, overlapping multiple wavefields can be described, in a far field approximation and in a given direction, by a single plane wave 334 that runs through the geometric center of the source array, as shown in FIG. 3.

Figure 4:
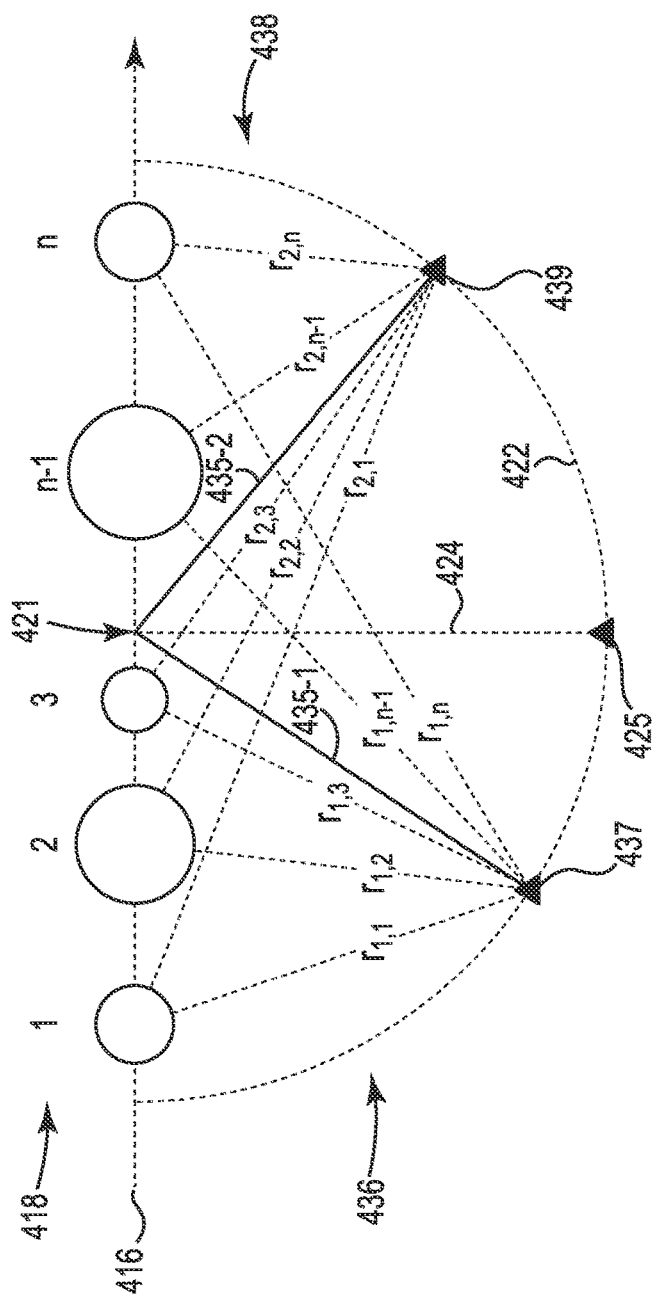
FIG. 4 illustrates a two-dimensional schematic representation of simulated far field measurement points at angular positions relative to the line between the center of the source array and the far field measurement point.

Because the measured far field signature and the estimated far field signatures have actual or simulated, respectively, far field measurement points in the far field region relative to the source array (e.g., as shown in FIG. 4 along an arc 422 of fixed radius 424 centered at source array center 421), one can locally approximate an expanding wave front by a plane wave (e.g., a plane locally tangent to the wave front at the far field measurement point). When the situation is inverted by considering the emitting source array as a passive receiving array and propagating the same plane wave backwards, as is, to the $x_0$ position at the source array center 321, a plane wave 334 results at the source array 316, as shown in FIG. 3.

As such, pertaining to the two-dimensional representation shown in FIG. 3, direction 331 represents the direction offset angle 332 relative to a direction of the measured far field signature 333, where both lines intersect at the source array center 321. The plane wave 334 can be represented in two dimensions as a line perpendicular to the direction 331 representing the offset angle 332 in the plane of that line and the vertical line and passing through the source array center 321. As a general case in three dimensions, whatever direction the line representing the offset angle is pointing relative to the measured far field signature, where both lines intersect at the source array center, the plane wave can be represented in three dimensions as a plane perpendicular to the line representing the offset angle and passing through the source array center.

Although the plane wave 334 is illustrated in FIG. 3 as a static object passing through the position of the source array center 321, the plane wave actually represents one moving plane wave that is sweeping through the source array at the given offset angle producing the time delays described herein. When the plane wave is not coming from the vertical direction, the plane wave will intersect each of the source positions 330-$x_1$, $x_2$, $x_3$, ..., $x_{n-1}$, $x_n$ at different times. The larger the offset angle 332, the larger the time delay difference will be between when the plane wave 334 intersects each of the source positions. As described herein, the moving plane wave 334 is considered to intersect the position $x_0$ at the source array center 321 at a time corresponding to time zero (t=0). Hence, the plane wave 334 intersects the source positions 330-$x_{n-1}$ and 330-$x_n$ before time zero and the source positions 330-$x_1$, $x_2$, and $x_3$ after time zero. When the plane wave is coming from the vertical direction, the plane wave will intersect each of the source positions 330-$x_1$, $x_2$, $x_3$, . . . $x_n$ at the same time, which results in an impulse response, as described herein, from the vertical direction having a value of one.

Estimation of a far field signature in a second direction from a far field signature in a first direction, as described herein, is enabled by determination of a transfer function that can transform a measured far field signature in the first direction to the desired far field signature in the second direction. The transfer function should be independent from the measured far field signature itself to operate independently. A transfer function that operates as such is achieved through use of an impulse response calculated using input parameters derived from the actual source array configuration. The source array, which is an active system that can be, by analogy as described above, regarded as a passive linear system responding to plane waves at various incidence angles that, by analogy, are the offset angles of the wave front from the source array center.

Using this analogy with a passive linear system, the impulse response of the source array at a given offset angle θ is the weighted sum of the individual predetermined weights ($w_j$) of the output of each of the source elements (n) composing the source array, after the application of the appropriate time delays that are a function of the position of each of the source elements (n) in the source array and the offset angle θ (e.g., as measured from the vertical), as described herein, such as follows in equation 2:

$$IR_{\theta(\omega)} = \frac{\sum_{j=1}^{n} w_j e^{-i\omega \frac{(x_j-x_0)\sin\theta}{v}}}{\sum_{j=1}^{n} w_j} \quad (2)$$

Further, as presented in equation 2, ω is the angular frequency (e.g., $2\pi f$, where f is the frequency of the impulse in cycles per second or hertz), $x_0$ is the position of the geometrical center of the source array relative to an arbitrary origin of the x-axis, $x_j$ is the position of source element number j in the source array relative to the same arbitrary origin of the x-axis, v is the acoustic wave velocity in water between the source array and the far field measurement point, the appropriate time delays being a function of the difference between $x_j$ and $x_0$ divided by v and taking into account the offset angle θ.

A weighted sum of the individual predetermined weighting factors $w_j$ of each of the source elements n of the source array can be determined by utilizing the relative amplitudes of each of the output impulses produced by the source elements in the source array. For example, because the output pressure from an air gun serving as a source element is generally proportional to the cube root of a volume of the gun chamber of each air gun, the weighting factors $w_j$ in equation 2 can be determined as follows in equation 3:

$$w_j = \sqrt[3]{volume_{SOURCE_j}} \quad (3)$$

For example, as shown in FIGS. 2-3, where the different sizes of the circles represent the source elements 218 in the source array 216 as being proportional to different relative amplitudes of an output impulse.

In general, with a substantially equal operating pressure, an air gun with a relatively larger chamber volume can produce relatively larger peak amplitudes that contribute to a relatively higher weighting factor than produced by an air gun with a relatively smaller chamber volume. The air guns of a source array can be selected with different chamber volumes and/or arranged in a particular manner in order to generate a resulting far field seismic wave with, for example, a short and narrow signature in the vertical-downward direction and with a spectrum that is smooth and broad over a frequency band of interest.

In various embodiments, each of the plurality of source elements can be selected from a group of source elements that can include air guns, water guns, explosives, and/or vibratory devices, among others. In various embodiments, the selected source elements can all be of the same type or can be a mixture of different types as long as the following conditions are satisfied: the measured far field signature of the plurality of the source elements is a sum of notional source element signatures for each of the plurality of source elements, a position of each source element is known relative to the geometric center of the plurality of the source elements, and a relative output amplitude for a wavefield created in water is predetermined for each of the plurality of the source elements.

For the purpose of clarity, the sources in equation 2 and FIGS. 2-3 are distributed along a one-dimensional axis. In practice, source elements in a source array can be distributed in two dimensions or in all three dimensions. Accordingly, equation 2 can be expressed as a function in two or three dimensions.

Continuing the analogy with a passive linear system, impulse response equation 2 is also known as a wave number response for the source array that describes the source array directivity, or response with offset angle θ, which is independent from the incident waveform. Staying with the one-dimensional expression, equation 2 can be rewritten as a wave number response, such as follows in equation 4:

$$IR_{\theta(K_x)} = \frac{\sum_{j=1}^{n} w_j e^{-iK_x(x_j-x_0)}}{\sum_{j=1}^{n} w_j} \quad (4)$$

where $$K_x = \omega \frac{\sin\theta}{v}$$

is termed a horizontal wave number.

A transfer function that transforms a vertical far field signature (or a far field signature in any other measured direction) to any other desired direction can be derived, as described herein, by a ratio between the source array impulse response in the desired direction and the impulse response measured in the vertical, or other, direction, such as follows in equation 5:

$$TF_{\theta(\omega)} = \frac{IR_{\theta(\omega)}}{IR_{\theta_0(\omega)}} \qquad (5)$$

The transfer function shown in equation 5 can be applied as a filter to a single measured far field signature to estimate far field signatures that would have been measured and/or extracted at the desired angles, such as follows in equation 6:

$$FFS_\theta = FFS_{measured} * tf_\theta \qquad (6)$$

where $tf_\theta$ is now in the time domain (e.g., $tf_\theta(t)=FFT^{-1}(TF_{\theta(\omega)})$, where $FFT^{-1}$ denotes an inverse Fourier transform) and * denotes convolution.

FIG. 4 illustrates a two-dimensional schematic representation of simulated far field measurement points at angular positions relative to the line between the center of the source array and the far field measurement point. As described herein, estimated far field signatures can be determined for a number of simulated far field measurement points.

Among various embodiments consistent with the present disclosure, FIG. 4 shows a source array 416 of source elements 418 distributed in one dimension relative to a source array center 421. The measured far field signature has an actual far field measurement point 425 and the estimated far field signatures have simulated far field measurement points 437, 439, each at one position far from the source array 416 along an arc 422 of fixed radius 424 centered at source array center 421. For example, as represented in two dimensions in FIG. 3, one can determine, as described herein, an estimated far field signature in a particular direction 331 that is offset at a particular desired angle 332, denoted as $\theta_i$, relative to the direction of the measured far field signature 333. The direction of the measured far field signature 333, as shown in FIG. 3, can be a line corresponding to the fixed radius 424 between the source array center 421 at $x_0$ and the actual far field measurement point 425, as shown in FIG. 4. Directions for estimated far field signatures in a number of particular directions 331 that are offset at particular desired angles 332, denoted as $\theta_i$, as shown in FIG. 3, can be, for example, lines 435-1, 435-2 corresponding to the fixed radius 424 between the source array center 421 at $x_0$ and the positions of the simulated far field measurement points 437, 439, as shown in FIG. 4.

Determination of at least one measured far field signature and a plurality of estimated far field signatures can provide a foundation for a system of equations, as described herein, for determination of notional source element signatures of each individual source element in a source array. For example, estimated far field signatures can be calculated in m−1 different directions, where m is greater than or equal to the number of source elements n in the source array for which the notional source element signatures are desired. Repeating the calculations in equations 2 to 6 for a number m different directions $\theta_i$ (where i=1, m−1) and including the measured far field signature yields a total of m far field signatures that can be used to build the system of equations.

The estimated far field signatures and the measured far field signature can be input together into equation (1), which is reproduced below for the sake of clarity, to provide a system of linear equations, such as follows in equation 7:

$$FFS_{\theta i} = \frac{1}{4\pi} \sum_{j=1}^{n} \frac{1}{r_{ij}} \cdot s_j\left(t - \frac{r_{ij}}{v}\right), \; i = 1, m; m \geq n \qquad (7)$$

-continued $$= \frac{1}{4\pi} \sum_{j=1}^{n} \frac{1}{r_{ij}} \cdot s_j(t) * \delta\left(t - \frac{r_{ij}}{v}\right), \; i = 1, m; m \geq n$$

where $r_{ij}$ is the distance from a source element's position j to a position of the $i^{th}$ simulated far field measurement point, * denotes convolution, and $\delta$ is the Dirac delta function:

$$\delta(t) = \begin{cases} 1, & t = 0 \\ 0, & t \neq 0 \end{cases},$$

For example, FIG. 4 shows two simulated far field signature directions 435-1, 435-2, where the first far field signature direction 435-1 is associated with a position of a first simulated far field measurement point 437 and the second far field signature direction 435-2 is associated with a position of a second simulated far field measurement point 439. For example, the number of source elements 418, as indicated by 418-1, 2, 3, . . . n−1, and n, are shown with their respective distances, as denoted by $r_{ij}$, from the position of the first simulated far field measurement point 437 and the position of the second simulated far field measurement point 439. That is, the $r_{ij}$ distances 436 from the source elements 418 to the position of the first simulated far field measurement point 437 are denoted as $r_{1,1}, r_{1,2}, r_{1,3}, r_{1,n-1}$, and $r_{1,n}$ and the $r_{ij}$ distances 438 from the source elements 418 to the position of the second simulated far field measurement point 439 are denoted as $r_{2,1}, r_{2,2}, r_{2,3}, r_{2,n-1}$, and $r_{2,n}$.

In various embodiments, equation 7 can be converted into Fourier domain notation, such as follows in equation 8:

$$FFS_i(\omega) = \frac{1}{4\pi} \sum_{j=1}^{n} \frac{1}{r_{ij}} e^{-i\omega \frac{r_{ij}}{v}} s_j(\omega), \qquad (8)$$

$$i = 1, m; m \geq n$$

In various embodiments, equation 7 can be converted into matrix notation, such as follows in equation 9:

$$FFS = G \cdot s \qquad (9)$$

where $FFS=[FFS_1(\omega), FFS_2(\omega), FFS_3(\omega), \ldots, FFS_m(\omega)]^T$ is a vector containing the m calculated and measured individual far field signatures at different angles, with T denoting transposition, $s=[s_1(\omega), s_2(\omega), s_3(\omega), \ldots, s_n(\omega)]^T$ is a vector containing the n unknown notional source element signatures from the n individual source elements in the source array, and G, as shown in Table 1, is a matrix of homogeneous 3D Green's functions for acoustic wave propagation from source element position j to simulated far field measurement point i. Equation 8 and equation 9 are essentially the same equation written in two different ways. They are both expressed in the Fourier ($\omega$) domain. Equation 8 is actually a set of equations, which is represented by a more convenient matrix form in equation 9. For clarity, an expanded form of the Green's functions matrix (G) is shown in Table 1.

TABLE 1

$$G = \frac{1}{4\pi}\begin{bmatrix} \frac{1}{r_{11}}e^{-i\omega\frac{r_{11}}{v}} & \frac{1}{r_{12}}e^{-i\omega\frac{r_{12}}{v}} & \cdots & \frac{1}{r_{1,n-1}}e^{-i\omega\frac{r_{1,n-1}}{v}} & \frac{1}{r_{1,n}}e^{-i\omega\frac{r_{1,n}}{v}} \\ \frac{1}{r_{21}}e^{-i\omega\frac{r_{21}}{v}} & \frac{1}{r_{22}}e^{-i\omega\frac{r_{22}}{v}} & \cdots & \frac{1}{r_{2,n-1}}e^{-i\omega\frac{r_{2,n-1}}{v}} & \frac{1}{r_{2,n}}e^{-i\omega\frac{r_{2,n}}{v}} \\ \vdots & \vdots & \ddots & \vdots & \vdots \\ \vdots & \vdots & \ddots & \vdots & \vdots \\ \frac{1}{r_{m-1,1}}e^{-i\omega\frac{r_{m-1,1}}{v}} & \frac{1}{r_{m-1,2}}e^{-i\omega\frac{r_{m-1,2}}{v}} & \cdots & & \frac{1}{r_{m-1,n}}e^{-i\omega\frac{r_{m-1,n}}{v}} \\ \frac{1}{r_{m,1}}e^{-i\omega\frac{r_{m,1}}{v}} & \frac{1}{r_{m,2}}e^{-i\omega\frac{r_{m,2}}{v}} & \cdots & \frac{1}{r_{m,n-1}}e^{-i\omega\frac{r_{m,n-1}}{v}} & \frac{1}{r_{mn}}e^{-i\omega\frac{r_{mn}}{v}} \end{bmatrix}$$

Green's functions can be used in marine seismic surveying to calculate, in a given medium, an impulse response at some known seismic receiver location from a wavefield generated at some known source position. As used herein, the Green's functions may be calculated in a homogeneous medium because the propagation from the source to the seismic receiver occurs in a relatively homogeneous medium with a constant and known acoustic velocity. The above linear system of equations in the matrix notation G can be inverted to provide the notional source element signatures for each source element in the source array, such as follows in equation 10:

$$s = G^{-1} \cdot \text{FFS} \qquad (10)$$

The notional source element signatures derived as such can be used with linear superposition equation 1 to calculate an estimated far field signature at any desired simulated far field measurement position and/or at any desired offset angle. Although equations 1-6 can be used to directly calculate an estimated far field signature at any desired simulated far field measurement position and/or at any desired offset angle without having to invert for the notional source element signatures, it may be more efficient and/or practical to do so by first determining at least some of the notional source element signatures, as described herein.

In various embodiments, two wave forms can be defined as a function of time. For example, one of the wave forms can be termed "wave form 1", which can be a measured vertical far field signature and the other wave form can be termed "wave form 2", which can be a measured far field signature determined at an offset angle relative to the vertical. In that case, another function of time can be calculated, which can be termed "wave form 3", which when subject to mathematical convolution with "wave form 1" can result in "wave form 2". Formally, this convolution can written as "wave form 1"*"wave form 3"="wave form 2", where the * sign indicates the convolution. As described herein, "wave form 3" represents the transfer function in the time domain.

Convolution is a mathematical operation that can involve many multiplications and additions, which can be complex and/or time consuming. As an alternative, the convolution operation can be performed in the Fourier frequency domain, where the operation can be simpler and/or less time consuming than convolution in the time domain. As such, transformation of the wave forms from the time domain to the frequency domain results in: "Fourier(wave form 1)"× "Fourier(wave form 3)"="Fourier(wave form 2)", where × indicates the multiplication. As such, "Fourier(wave form 3)" now represents the transfer function in the frequency domain.

The real coefficients of a time function may transform into complex numbers in the Fourier frequency domain with one complex number for every frequency. Continuous signal functions of time can be decomposed into a sum of sinusoids with different periods that have certain amplitudes and time delays.

The Fourier transform is one such decomposition into frequencies. For a real function, Fourier coefficients are complex numbers as a function of the frequency. For example, frequency $f_i$ can have a Fourier coefficient given by the complex number x+iy, where x is the real part and y is the imaginary part. The amplitude and the phase at frequency $f_i$ are provided by $\sqrt{x^2+y^2}$ and $\tan^{-1} y/x$, respectively. Accordingly, the amplitude and phase spectra of a signal are the above quantities as a function of frequency and graphs of these parameters can be formed to provide amplitude and phase spectra versus frequency plots. Such amplitude and phase spectra can provide a description of the corresponding time signal in the frequency domain.

Figure 5:
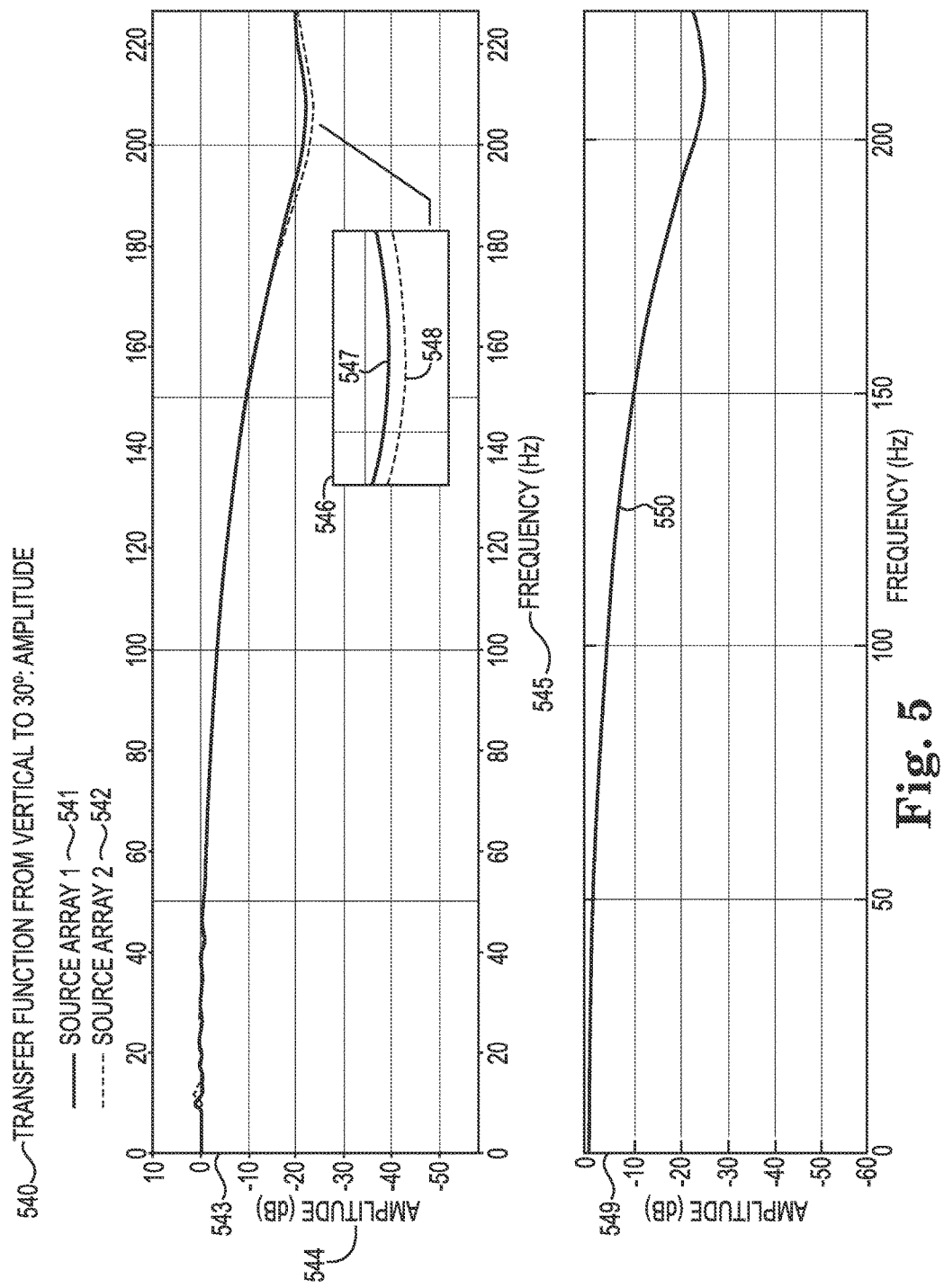
FIG. 5 illustrates a variation in amplitude of a transfer function that transforms a vertical far field signature measurement to a 30 degree offset angle far field signature measurement as determined across a frequency spectrum.

FIG. 5 illustrates a variation in amplitude of a transfer function that transforms a vertical far field signature measurement to a 30 degree offset angle far field signature measurement as determined across a frequency spectrum. The plots 540 of a variation in amplitude 544 of the transfer function from vertical to 30° across the frequency spectrum 545 shown in FIG. 5 represent a plot 543 of transfer functions determined from a measured far field signature in the vertical direction, below the geometric center of the source array, to a measured far field signature at a 30° offset angle from the vertical and a plot 549 of a variation in amplitude 544 of a theoretical transfer function from vertical to 30° across the frequency spectrum 545. The quantities being compared in plots 540 are transfer functions from one measurement angle to another angle.

The theoretical transfer function can be calculated without measurement of any far field signatures by just using the source array geometry, as described herein. A theoretical transfer function curve is a plot of equation 5, as presented above. The theoretical transfer function curves 550, 659, 766, and 873 shown in plots 549, 658, 765, and 872 in FIGS. 5-8 plot the amplitude and phase spectra as a function of frequency f (amplitude spectra in plots 549 and 765 and phase spectra in plots 658 and 872). The theoretical transfer function can be compared to the transfer function calculated as "Fourier(wave form 3)", which is calculated from two measured far field signatures that have been modeled, as in plot 543, using the same source array used to calculate the theoretical transfer function.

As shown on the vertical axis of plots 543 and 549, amplitude in the context of a transfer function has no real units. The scale is relative amplitude. The decibel (dB) scale comes from plotting 20·log(amplitude) instead of just the amplitude. The dB scale is a logarithmic scale used in physics to express a ratio between two values of a physical quantity. The ratio being expressed on the vertical axis of plot 543 is: Fourier(wave form 3) representing the transfer function=Fourier(wave form 2)/Fourier(wave form 1). The ratio being expressed on the vertical axis of plot 549 is the corresponding theoretical ratio represented in equation 5. As shown on the horizontal axis of plots 543 and 549, frequency spectrum 545 is the inverse, or dual, of time and has units of hertz (Hz), which indicates cycles/second.

The modeled and theoretical transfer function plots shown in FIGS. 5-8 are derived from known standard source arrays. The modeled transfer function plots shown at 543, 653, 761, and 868 are derived from calculation of far field signatures produced by two different air gun source arrays that are formed from one or more strings (i.e., one-dimensional source arrays) with a number of air guns on each string. A first source array having a single string with 10 individual air guns, shown at 541 in FIG. 5, is denoted as "Source Array 1". A second source array having two strings with 20 individual air guns, shown at 542 in FIG. 5, is denoted as "Source Array 2". As such, Source Array 2 has a total gun volume that is twice the total gun volume of Source Array 1 and each air gun in the two source arrays has a substantially equal output impulse amplitude.

In some embodiments, for each source array, a calculated Wiener filter can be used to convert a vertical far field signature into an off-vertical far field signature. As such, the calculated Wiener filter can be a reference transfer function used for plots 543, 653, 761, and 868. In some embodiments, the theoretical wave-number responses can be calculated with the source array geometries presented above. In some embodiments, the theoretical wave-number responses can be compared with the corresponding Wiener filter responses used as the reference transfer function.

In plot 543 of FIG. 5, the quantities being compared are amplitudes 544 of transfer functions from a measured vertical far field signature relative to a measured far field signature at a 30° offset angle, as determined across the frequency spectrum 545, resulting from source arrays 541, 542 of different geometries. As shown in plot 543, the plots for the two different source array geometries are largely indistinguishable at this scale because of overlap. However, for the sake of clarity, a zoom 546 is provided to show at 547 that the relative amplitude produced by the source array 541 having the single string is slightly higher than the amplitude produced by the source array 542 having two strings, as shown at 548. Moreover, the shapes of the amplitude curves derived from measured far field signatures shown in plot 543 are notably similar to the shape of the theoretical transfer function curve 550 in the theoretical plot 549 based on the theoretical wave number response.

Figure 6:
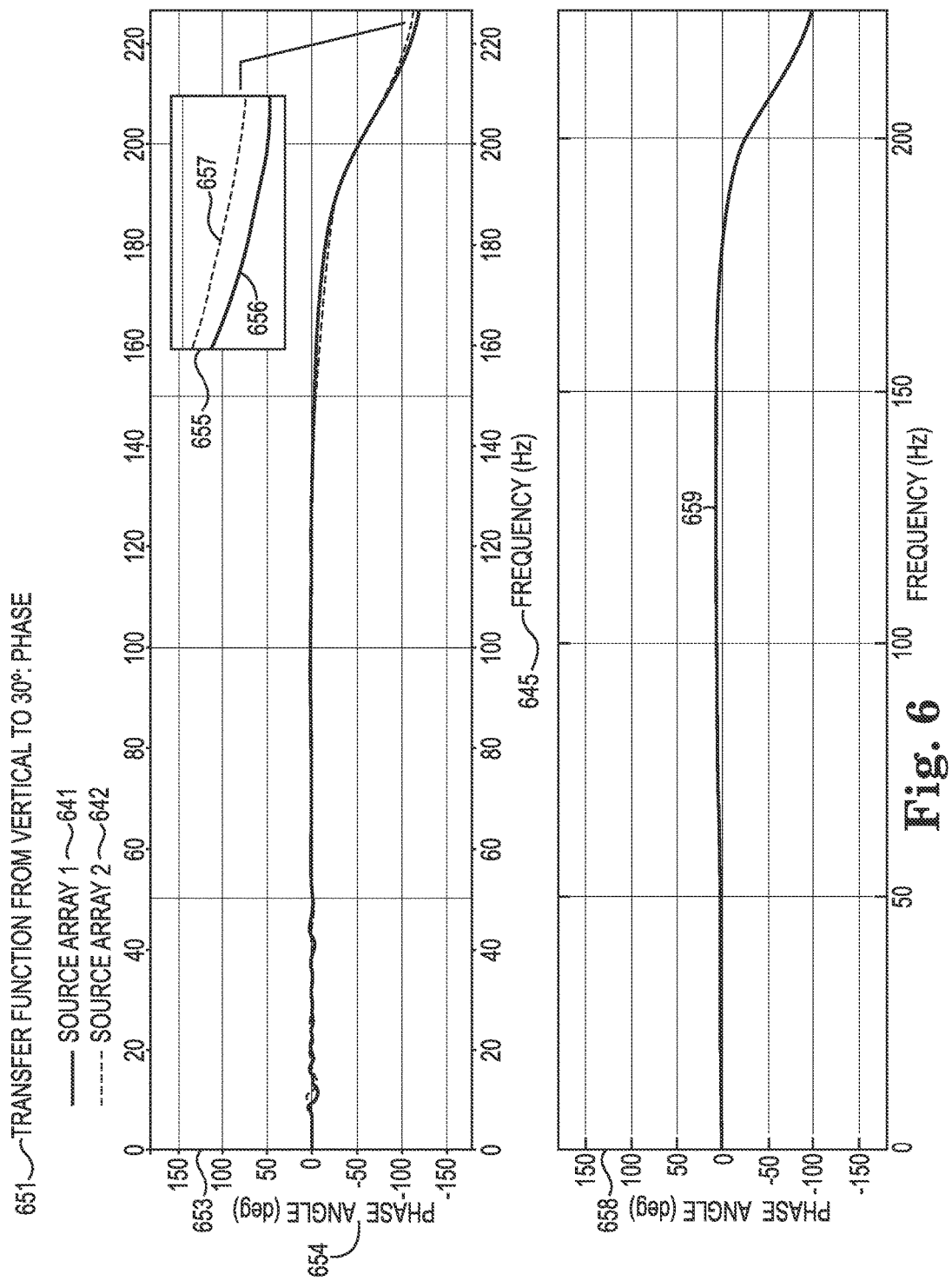
FIG. 6 illustrates a variation in phase of a transfer function that transforms the vertical far field signature measurement to a 30 degree offset angle far field signature measurement as determined across the frequency spectrum.

FIG. 6 illustrates a variation in phase of a transfer function that transforms the vertical far field signature measurement to a 30 degree offset angle far field signature measurement as determined across the frequency spectrum. The plots 651 of a variation in phase angle 654 of the transfer function from vertical to 30° across the frequency spectrum 645 shown in FIG. 6 represent a plot 653 of transfer functions determined from a measured far field signature vertically, below the geometric center of the source array, to a measured far field signature at a 30° offset angle from the vertical and a plot 658 of a variation in phase angle 654 of a theoretical transfer function from vertical to 30° across the frequency spectrum 645. The quantities being compared in plots 651 are transfer functions from one measurement angle to another angle.

The theoretical transfer function can be calculated without measurement of any far field signatures by just using the source array geometry, as described herein. The theoretical transfer function can be compared to the transfer function calculated as "PHASE(Fourier(wave form 3))", which is calculated from two measured far field signatures that have been modeled, as in plot 653, using the same source array used to calculate the theoretical transfer function.

The scale of the vertical axis of plots 653 and 568 expresses the phase angle 654 of the transfer functions described with regard to FIG. 5 in degrees. As shown on the horizontal axis of plots 654 and 658, frequency 645 is the inverse, or dual, of time and has units of Hz.

In plot 653 of FIG. 6, the quantities being compared are phase angles 654 of transfer functions from a measured vertical far field signature relative to a measured far field signature at a 30° offset angle, as determined across the frequency spectrum 645, resulting from source arrays 641, 642 of different geometries, such as the geometries of the source arrays previously described with regard to FIG. 5. As shown in plot 653, the plots for the two different source array geometries are largely indistinguishable at this scale because of overlap. However, for the sake of clarity, a zoom 655 is provided to show at 657 that the relative phase angle produced by the source array 641 having the single string is slightly lower than the phase angle produced by the source array 642 having two strings, as shown at 656. Moreover, the shapes of the phase angle curves derived from measured far field signatures shown in plot 653 are notably similar to the shape of the phase angle curve 659 in the theoretical plot 658 based on the theoretical wave number response.

Figure 7:
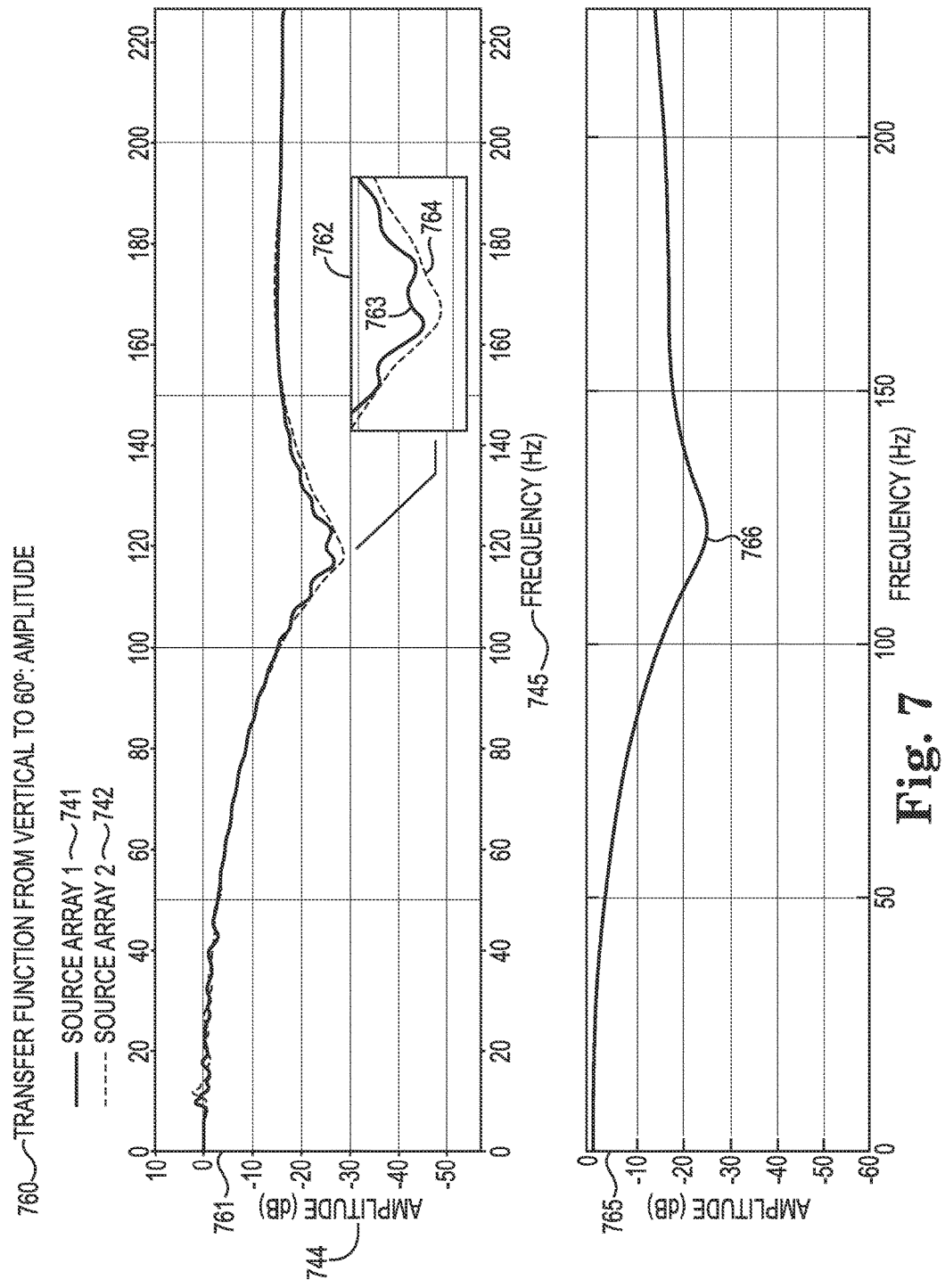
FIG. 7 illustrates a variation in amplitude of a transfer function that transforms the vertical far field signature measurement to a 60 degree offset angle far field signature measurement as determined across the frequency spectrum.

FIG. 7 illustrates a variation in amplitude of a transfer function that transforms the vertical far field signature measurement to a 60 degree offset angle far field signature measurement as determined across the frequency spectrum. The plots 760 of a variation in amplitude 744 of the transfer function from vertical to 60° across the frequency spectrum 745 shown in FIG. 7 represent a plot 761 of transfer functions determined from a measured far field signature in the vertical direction, below the geometric center of the source array, to a measured far field signature at a 60° offset angle from the vertical and a plot 765 of a variation in amplitude 744 of a theoretical transfer function from vertical to 60° across the frequency spectrum 745. The quantities being compared in plots 760 are transfer functions from one measurement angle to another angle. The theoretical transfer function can be compared to the transfer function calculated as "Fourier(wave form 3)", which is calculated from two measured (e.g., known) far field signatures that have been modeled, as in plot 761, using the same source array used to calculate the theoretical transfer function.

In plot 761 of FIG. 7, the quantities being compared are amplitudes 744 of transfer functions from measured a vertical far field signature relative to a measured far field signature at a 60° offset angle, as determined across the frequency spectrum 745, resulting from source arrays 741, 742 of different geometries, such as the geometries of the source arrays previously described with regard to FIG. 5. As shown in plot 761, the plots for the two different source array geometries are largely indistinguishable at this scale because of overlap. However, for the sake of clarity, a zoom 762 is provided to show at 763 that the relative amplitude produced by the source array 741 having the single string is slightly higher than the amplitude produced by the source array 742 having two strings, as shown at 764. Moreover, the shapes of the amplitude curves derived from measured far field signatures shown in plot 761 are notably similar to the shape of the amplitude curve 766 in the theoretical plot 765 based on the theoretical wave number response.

Figure 8:
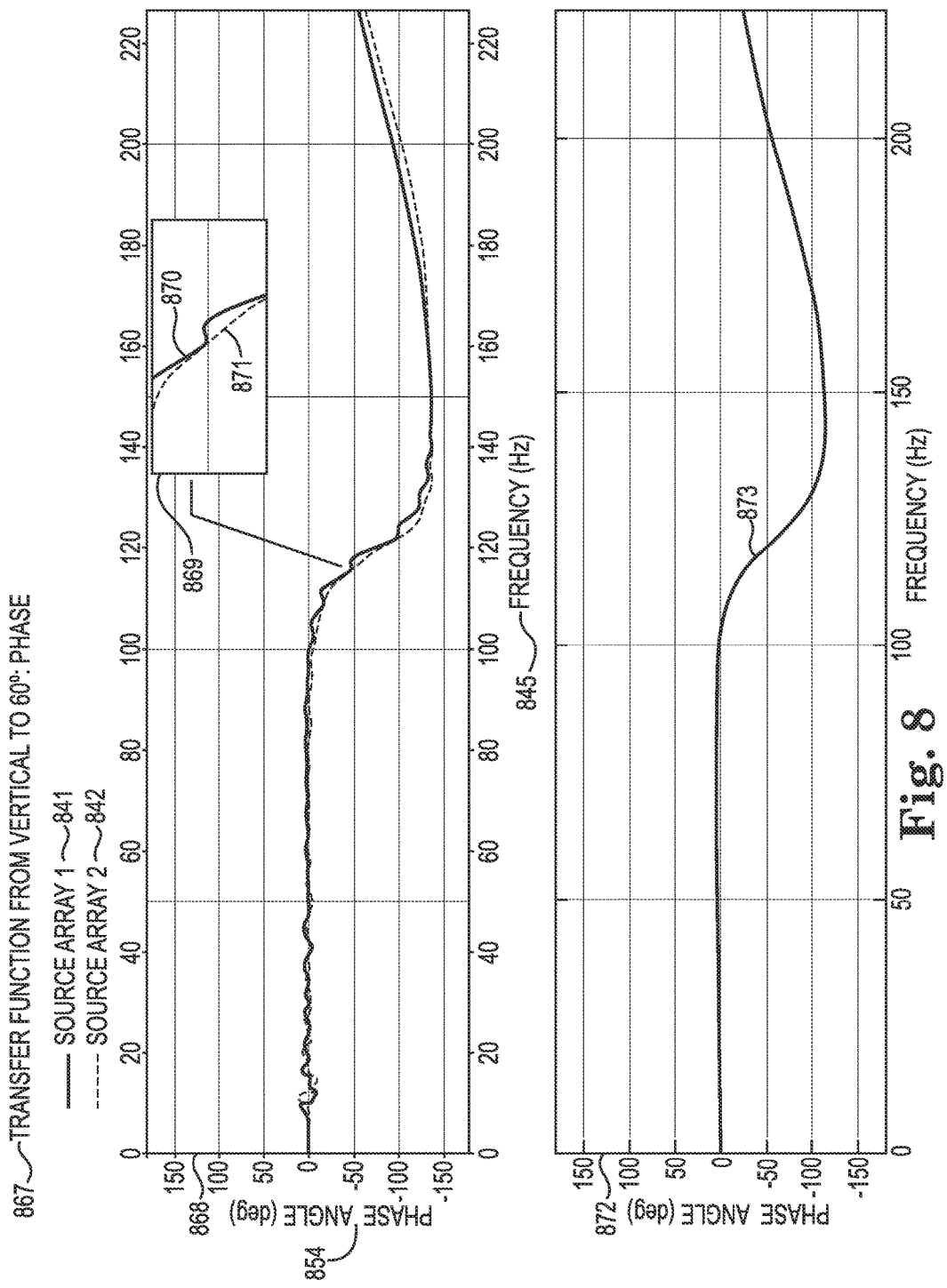
FIG. 8 illustrates a variation in phase of the transfer function that transforms the vertical far field signature measurement to a 60 degree offset angle far field signature measurements determined across the frequency spectrum.

FIG. 8 illustrates a variation in phase of the transfer function that transforms the vertical far field signature measurement to a 60 degree offset angle far field signature measurement as determined across the frequency spectrum. The plots 867 of a variation in phase angle 854 of the transfer function from vertical to 60° across the frequency spectrum 845 shown in FIG. 8 represent a plot 868 of transfer functions determined from a measured far field signature vertically, below the geometric center of the source array, to a measured far field signature at a 60° offset angle from the vertical and a plot 872 of a variation in phase angle 854 of a theoretical transfer function from vertical to 60° across the frequency spectrum 845. The quantities being compared in plots 867 are transfer functions from one measurement angle to another angle.

The theoretical transfer function can be calculated without measurement of any far field signatures by just using the source array geometry, as described herein. The theoretical transfer function can be compared to the transfer function calculated as "PHASE(Fourier(wave form 3))", which is calculated from two measured far field signatures that have been modeled, as in plot 868, using the same source array used to calculate the theoretical transfer function.

In plot 868 of FIG. 8, the quantities being compared are phase angles 854 of transfer functions from a measured vertical far field signature relative to a measured far field signature at a 60° offset angle, as determined across the frequency spectrum 845, resulting from source arrays 841, 842 of different geometries, such as the geometries of the source arrays previously described with regard to FIG. 5. As shown in plot 868, the plots for the two different source array geometries are largely indistinguishable at this scale because of overlap. However, for the sake of clarity, a zoom 869 is provided to show at 870 that the relative phase angle produced by the source array 841 having the single string is slightly higher than the phase angle produced by the source array 842 having two strings, as shown at 871. Moreover, the shapes of the phase angle curves derived from measured far field signatures shown in plot 868 are notably similar to the shape of the phase angle curve 873 in the theoretical plot 872 based on the theoretical wave number response.

In addition to using source modeling tools to calculate far field signatures in different directions, as used for the modeled transfer function plots shown at 543, 653, 761, and 868, in some embodiments, so-called near field measurements can be used, when available, to approximate these results.

Figure 9:
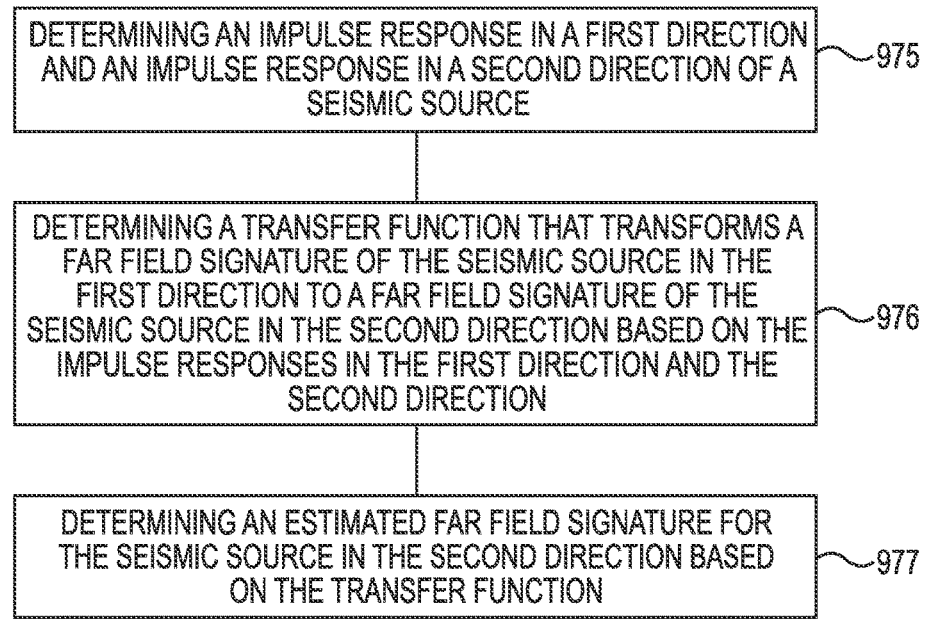
FIG. 9 illustrates a method flow diagram for estimation of a far field signature in a second direction from a far field signature in a first direction.

FIG. 9 illustrates a method flow diagram for estimation of a far field signature in a second direction from a far field signature in a first direction. At block 975, the method can include determining an impulse response in a first direction and an impulse response in a second direction of a seismic source. As described herein, methods (e.g., determining, calculating, predicting, estimating, etc.) can be performed by a machine, for example, a computing device. In various embodiments, a seismic source can include any number of source elements as long as the geometry of each source element relative to the other source elements and/or relative to the geometric center of a source array of the source elements is known. Although various embodiments that have more than one source element have been described herein, derivation of the impulse response by equation 2 is equally valid using a single source element. That is, if n=1 is used in equation 2, then $x_j$ will be equal to $x_0$, so that the exponential will equal 1 and the relative weight of the single source element $w_j$ will also equal 1. As such, the $IR_{\theta_j(\omega)}$ value will be 1 at any angle relative to the single source element.

As described herein, the method can include determining the impulse response of a plurality of source elements positioned in a source array. In various embodiments, a source array can be a one-dimensional, two-dimensional, or three-dimensional source array of the plurality of source elements at known positions. For example, each source element can be positioned at a known distance from a geometric center of the source array. In various embodiments, as described herein, the method can include determining a relative amplitude of an impulse produced by each source element in the source array.

As described herein with regard to equation 2, the method can include determining the impulse response in the first direction and the impulse response in the second direction by calculating the impulse responses based at least in part on the position of each source element and the determined relative amplitude of the impulse produced by each source element. As further described herein with regard to equation 2, the method can include determining the impulse response in the first direction and the impulse response in the second direction by calculating the impulse responses based at least in part on summing a number of source element weights including a time delay for the impulse of each source element.

At block 976, the method can include determining a transfer function that transforms a far field signature of the seismic source in the first direction to a far field signature of the seismic source in the second direction based on corresponding impulse responses in the first direction and the second direction. In various embodiments, as described herein, the method can include measuring the far field signature in the first direction. In various embodiments, as described herein, the method can include determining a ratio between a calculated impulse response of the seismic source in the second direction and a calculated impulse response of the seismic source in the first direction to contribute to determining the transfer function. Accordingly, at block 977, the method can include determining an estimated far field signature for the seismic source in the second direction based on the transfer function.

In accordance with a number of embodiments of the present disclosure, a geophysical data product may be produced from the far field signature of a source and/or data acquired in a marine seismic survey utilizing the source. Geophysical data may include, among various embodiments, an impulse response of a seismic source in a first direction, an impulse response of the seismic in a second direction, a far field signature of the seismic source in the first direction, a far field signature of the seismic source in the second direction based on corresponding impulse responses in the first direction and the second direction, an estimated far field signature for the seismic source in the second direction based on the transfer function, and marine seismic survey data acquired using the seismic source. A geophysical data product may be produced by obtaining at least a portion of the geophysical data and processing such geophysical data to generate the geophysical data product.

The geophysical data product may be accessed and/or stored on a non-transitory, tangible machine-readable medium suitable for importing onshore. The geophysical data product may be produced by acquiring geophysical data, processing the geophysical data offshore and/or processing the geophysical data onshore either within the United States or in another country. If the geophysical data product is produced offshore and/or in another country, it may be imported onshore to a facility in the United States. In some instances, once onshore in the United States, further data processing and/or geophysical analysis may be performed on the geophysical data product. In some instances, geophysical analysis may be performed on the geophysical data product offshore. For example, the transfer function that transforms the far field signature of the seismic source in the first direction to the far field signature of the seismic source in the second direction can be determined from data offshore to facilitate other processing of the measured data either offshore or onshore. As another example, the estimated far field signature for the seismic source in the second direction based on the transfer function can be determined from data offshore or onshore to facilitate other processing of the measured data either offshore or onshore.

Figure 10:
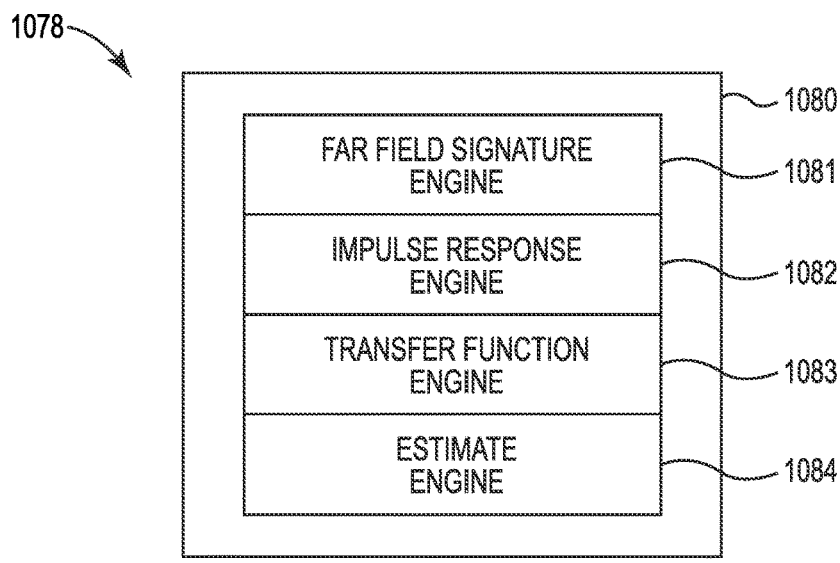
FIG. 10 illustrates a diagram of a system for estimation of a far field signature in a second direction from a far field signature in a first direction.

FIG. 10 illustrates a diagram of a system for estimation of a far field signature in a second direction from a far field signature in a first direction. The system 1078 can include a subsystem 1080, and/or a number of engines, such as far field signature engine 1081, impulse response engine 1082, transfer function engine 1083, and/or estimate engine 1084, and can be in communication with a data store, such as memory, via a communication link. The system 1078 can include additional or fewer engines than illustrated to perform the various functions described herein. The system can represent program instructions and/or hardware of a machine (e.g., machine 1185 as referenced in FIG. 11, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium (MRM), computer-readable medium (CRM), etc.) as well as in a hard-wired program (e.g., logic). Hard-wired program instructions (e.g., logic) can be considered as both program instructions and hardware.

The far field signature engine 1081 can include a combination of hardware and program instructions that is configured to determine a measured far field signature in a first direction of a seismic source. The impulse response engine 1082 can include a combination of hardware and program instructions that is configured to determine an impulse response in a first direction and an impulse response in a second direction for the impulses emitted by the seismic source. The transfer function engine 1083 can include a combination of hardware and program instructions that is configured to determine a transfer function that transforms the measured far field signature in the first direction to a far field signature in the second direction based on the impulse responses in the first direction and the second direction. Accordingly, the estimate engine 1084 can include a combination of hardware and program instructions that is configured to estimate the far field signature of the seismic source in the second direction based on the transfer function.

In various embodiments, as described herein, the far field signature engine 1082 can further determine a measured far field signature in a first direction representing a superposition of impulse data representing detected impulses emitted by a plurality of source elements. As described herein, the impulse response engine 1082 can further determine an impulse response in a first direction and an impulse response in a second direction for the impulses emitted by the plurality of source elements. As described herein, the transfer function engine 1083 can further determine a transfer function that transforms the measured far field signature in the first direction to a far field signature in a second direction based on the impulse responses in the first direction and the second direction. In addition, as described herein, the estimate engine 1084 can further estimate the far field signature of at least one of the plurality of source elements in the second direction based on the transfer function.

In various embodiments, the impulse data can be input to the far field signature engine 1081 from the plurality of source elements positioned in a source array, as described herein, where each source element can emit an impulse substantially simultaneously. In various embodiments, as described herein, each of the source elements can be positioned at a known distance from a geometric center of the source array when emitting the impulse. In various embodiments, the system 1078 can include a far field measurement engine to send the impulse data representing impulses detected by a seismic receiver at least one far field measurement point to the far field signature engine 1081.

In various embodiments, the system 1078 can include an estimated notional source element signature engine to, as described with regard to FIG. 4, determine, based on the transfer function, a plurality of estimated far field signatures in a plurality of directions for the plurality of source elements in addition to the measured far field signature and determine an estimated notional source element signature for each of the plurality of source elements based at least in part on the plurality of estimated far field signatures. As described herein, the estimated notional source element signature engine can determine the notional source element signature for each source element from a known position of each of the plurality of source elements to each of a number of simulated far field measurement points.

Figure 11:
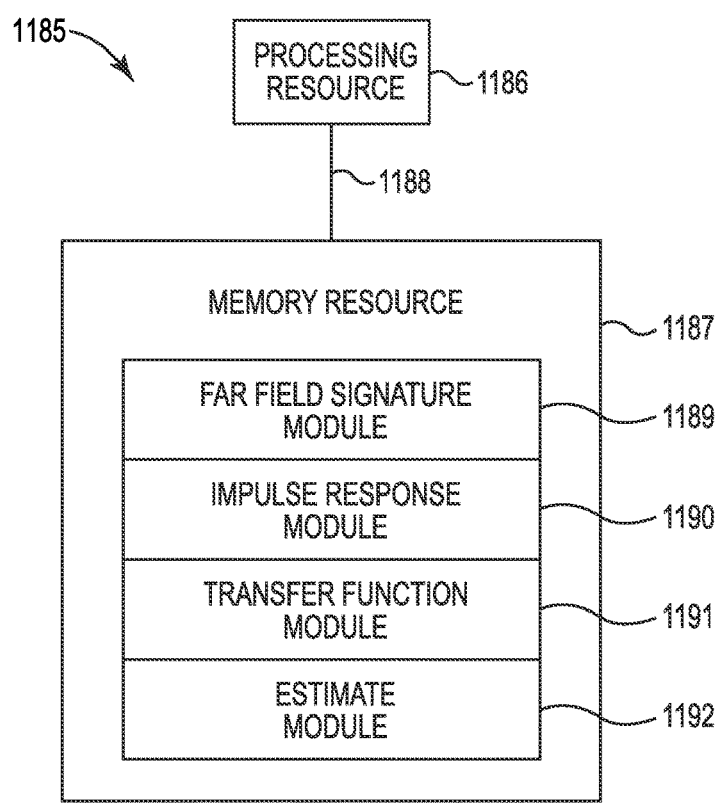
FIG. 11 illustrates a diagram of a machine for estimation of a far field signature in a second direction from a far field signature in a first direction.

FIG. 11 illustrates a diagram of a machine for estimation of a far field signature in a second direction from a far field signature in a first direction. The machine 1185 can utilize software, hardware, firmware, and/or logic to perform a number of functions. The machine 1185 can be a combination of hardware and program instructions configured to perform a number of functions (e.g., actions). The hardware, for example, can include a number of processing resources 1186 and a number of memory resources 1187, such as a MRM, CRM, or other memory resources 1187. The memory resources 1087 can be internal and/or external to the machine 1185. For example, the machine 1185 can include internal memory resources and have access to external memory resources, among other embodiments. The program instructions (e.g., machine-readable instructions (MRI), computer-readable instructions (CRI), etc.) can include instructions stored on the MRM to implement a particular function (e.g., an action). For example, a set of MRI can be executable by one or more of the processing resources 1186. The memory resources 1187 can be coupled to the machine 1185 in a wired and/or wireless manner. For example, the memory resources 1187 can be an internal memory, a portable memory, a portable disk, and/or a memory associated with another resource (e.g., enabling MRI to be transferred and/or executed across a network, such as the Internet). As used herein, a "module" can include program instructions and/or hardware, but at least includes program instructions.

Memory resources 1187 can be non-transitory and can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of MRM.

The processing resources 1186 can be coupled to the memory resources 1187 via a communication path 1188. The communication path 1188 can be local or remote to the machine 1185. Examples of a local communication path 1188 can include an electronic bus internal to a machine, where the memory resources 1187 are in communication with the processing resources 1186 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 1188 can be such that the memory resources 1187 are remote from the processing resources 1186, such as in a network connection between the memory resources 1187 and the processing resources 1186. That is, the communication path 1188 can be a network connection. Examples of such a network connection can include a local area network (LAN), wide area network (WAN), personal area network (PAN), and the Internet, among others.

As shown in FIG. 11, the MRI stored in the memory resources 1187 can be segmented into a number of modules 1189, 1190, 1191, 1192 that when executed by the processing resources 1186 can perform a number of functions. As used herein, a module includes a set of instructions included to perform a particular task or action. The number of modules 1189, 1190, 1191, 1192 can be sub-modules of other modules. For example, the far field signature module 1189 can be a sub-module of the impulse response module 1190 and/or the far field signature module 1189 and the impulse response module 1190 can be contained within a single module. Furthermore, the number of modules 1189, 1190, 1191, 1192 can include individual modules separate and distinct from one another. Examples are not limited to the specific modules 1189, 1190, 1191, 1192 illustrated in FIG. 11.

Each of the number of modules 1189, 1190, 1191, 1192 can include program instructions and/or a combination of hardware and program instructions that, when executed by a processing resource 1186, can function as a corresponding engine as described with respect to FIG. 10. For example, the far field signature module 1189 can include program instructions and/or a combination of hardware and program instructions that, when executed by a processing resource 1186, can function as the far field signature engine 1081, the impulse response module 1190 can include program instructions and/or a combination of hardware and program instructions that, when executed by a processing resource 1186, can function as the impulse response engine 1082, the transfer function module 1191 can include program instructions and/or a combination of hardware and program instructions that, when executed by a processing resource 1186, can function as the transfer function engine 1083, and/or the estimate module 1192 can include program instructions and/or a combination of hardware and program instructions that, when executed by a processing resource 1186, can function as the estimate engine 1084.

As described with regard to FIG. 4, the machine 1185 can include an impulse response module 1190 that can include instructions to determine a number of impulse responses of a seismic source, where the seismic source can include a plurality of source elements. In various embodiments, as described herein, the plurality of source elements can be positioned in a source array. The machine 1185 can further include a transfer function module 1191 that can include instructions to determine a number of transfer functions that transform a far field signature of the seismic source in a particular measured direction to a far field signature of the seismic source in a plurality of other directions based on the number of impulse responses of the seismic source. In addition, the machine 1185 can further include an estimate module 1192 that can include instructions to determine a plurality of estimated far field signatures for the seismic source in the plurality of other directions based on the transfer functions and determine an estimated notional source element signature for at least one source element in the seismic source based at least in part on the plurality of estimated far field signatures. In some embodiments, the transfer function module 1191 can include instructions to determine m−1 transfer functions for m−1 different directions for which estimated far field signatures can be calculated, for example, to invert for the notional source element signatures, as described herein.

The machine 1185 can further include instructions to determine the estimated notional source element signature for the at least one source element in the seismic source based at least in part on the plurality of estimated far field signatures in addition to at least one measured far field signature. The measured far field signature can be obtained by the machine 1185 including the far field signature engine 1081, which can include instructions to determine at least one measured far field signature, as described herein. The total number of estimated far field signatures in addition to the at least one measured far field signature can be at least equal to a total number of source elements in the seismic source.

As further described with regard to FIG. 4, the machine 1185 can include instructions to determine an estimated notional source element signature for each source element based at least in part on a matrix of homogeneous three-dimensional Green's functions for wave propagation from a known position of each of the plurality of source elements to each of a number of simulated far field measurement points. In addition, the machine 1185 can include instructions to determine a revised estimated far field signature for the seismic source in one of the plurality of other directions based on input of a notional source element signature for a plurality of the source elements in the source array.

As described herein, determination of estimated far field signatures for a source array involves a determination of the positions of the source elements in the source array geometry. As such, the source array directivity is not dependent on the actual source element signatures themselves. That is, the directivity is determined by the actual source array geometry and source element weights $w_j$ determined from air gun volumes. In various embodiments, determination of estimated far field signatures for a source array can be extended to use a plurality of measured far field signatures instead of just one. Using more than one measured far field signature can improve the accuracy of the estimated signatures and thus improve robustness.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, by a machine, a seismic data set measured by a receiver at a far field measurement point associated with a seismic source having a plurality of source elements particularly positioned in and relative to a geometric center of a source array, wherein the seismic data set is indicative of a subterranean formation;
   determining, by the machine, an impulse response in a first direction and an impulse response in a second direction of the seismic source using the seismic data set;
   determining, by the machine, a transfer function that transforms a far field signature of the seismic source in the first direction to a far field signature of the seismic source in the second direction based on corresponding impulse responses in the first direction and the second direction and a particular geometry of the plurality of source elements;
   determining, by the machine and based on the transfer function, an estimated far field signature at a simulated far field measurement point that does not correspond to the receiver for the seismic source in the second direction to yield seismic data better indicative of the subterranean formation including characteristics of an associated down-going wavefield than the received seismic data set;
   generating a seismic image based on the estimated far field signature and the data that is better indicative of the subterranean formation than the received seismic data set; and
   recording the seismic image on a non-transitory machine-readable medium.

2. The method of claim 1, wherein determining the impulse response of the seismic source comprises determining the impulse response of the plurality of source elements positioned in the source array.

3. The method of claim 2, comprising each source element being positioned at a known distance from the geometric center of the source array.

4. The method of claim 3, comprising determining a relative amplitude of an impulse produced by each source element in the source array.

5. The method of claim 4, comprising determining the impulse response in the first direction and the impulse response in the second direction by calculating the impulse responses based at least in part on the position of each source element and the determined relative amplitude of the impulse produced by each source element.

6. The method of claim 4, comprising determining the impulse response in the first direction and the impulse response in the second direction by calculating the impulse responses based at least in part on summing a number of source element weights comprising a time delay for the impulse of each source element.

7. The method of claim 1, wherein determining the transfer function that transforms the far field signature of the seismic source in the first direction to the far field signature of the seismic source in the second direction comprises measuring the far field signature in the first direction.

8. The method of claim 7, wherein determining the transfer function comprises determining a ratio between a calculated impulse response of the seismic source in the second direction and a calculated impulse response of the seismic source in the first direction.

9. A system, comprising:
   a memory resource to receive a seismic data set measured by a receiver at a far field measurement point associated with a seismic source having a plurality of source elements particularly positioned in and relative to a geometric center of a source array, wherein the seismic data set is indicative of a subterranean formation;
   a far field signature engine to determine a measured far field signature of the seismic source using the seismic data set;
   an impulse response engine to determine an impulse response in a first direction and an impulse response in a second direction for the impulses emitted by the seismic source using the seismic data set;
   a transfer function engine to determine a transfer function that transforms the measured far field signature in the first direction to a far field signature in a second direction based on the impulse responses in the first direction and the second direction and a particular geometry of the plurality of source elements; and
   an estimate engine to:
      estimate the far field signature of the seismic source in the second direction based on the transfer function at a simulated far field measurement point to yield seismic data better indicative of the subterranean formation including characteristics of an associated down-going wavefield than the received seismic data set;
      generate a seismic image based on the estimated far field signature and the data that is better indicative of the subterranean formation than the received seismic data set and
   instructions executable by a processor to record the seismic image on a non-transitory machine-readable medium.

10. The system of claim 9, wherein:
   the far field signature engine further determines a measured far field signature in a first direction representing a superposition of impulse data representing detected impulses emitted by the plurality of source elements;
   the impulse response engine further determines an impulse response in a first direction and an impulse response in a second direction for the impulses emitted by the plurality of source elements;

the transfer function engine further determines a transfer function that transforms the measured far field signature in the first direction to a far field signature in a second direction based on the impulse responses in the first direction and the second direction; and the estimate engine further estimates the far field signature of at least one of the plurality of source elements in the second direction based on the transfer function.

11. The system of claim 10, including the impulse data input to the far field signature engine from the plurality of source elements positioned in the source array, wherein each source element emits an impulse substantially simultaneously.

12. The system of claim 11, wherein each source element is positioned at a known distance from the geometric center of the source array when emitting the impulse.

13. The system of claim 9, including a far field measurement engine to send the impulse data representing impulses detected by the receiver at a far field measurement point to the far field signature engine.

14. The system of claim 10, including an estimated notional source element signature engine to:

determine, based on the transfer function, a plurality of estimated far field signatures in a plurality of directions for the plurality of source elements in addition to the measured far field signature; and determine an estimated notional source element signature for each of the plurality of source elements based at least in part on the plurality of estimated far field signatures.

15. The system of claim 14, including the estimated notional source element signature engine to determine the notional source element signature for each source element from a known position of each of the plurality of source elements to each of a number of simulated far field measurement points.

16. The system of claim 10, including each of the plurality of source elements being selectable, by a source selection engine, from a group of source elements that includes air guns, water guns, explosives, and vibratory devices such that:

the measured far field signature of the plurality of the source elements is a sum of notional source element signatures for each of the plurality of source elements:

a position of each source element is known relative to the geometric center of the plurality of the source elements; and a relative output amplitude for a wavefield created in water is predetermined for each of the plurality of the source elements.

17. A non-transitory machine-readable medium storing instructions executable by a processing resource to cause the machine to:

receive a seismic data set measured by a receiver at a far field measurement point associated with a seismic source, wherein the seismic data set is indicative of a subterranean formation;

determine a number of impulse responses of the seismic source using the measured seismic data set, wherein the seismic source comprises a plurality of source elements particularly positioned in and relative to a geometric center of a source array;

determine a number of transfer functions that transform a far field signature of the seismic source in a particular measured direction to a far field signature of the seismic source in a plurality of other directions based on the number of impulse responses of the seismic source and a particular geometry of the plurality of source elements;

determine a plurality of estimated far field signatures for the seismic source at a plurality of simulated far field measurement points in the plurality of other directions based on the transfer functions; and determine an estimated notional source element signature for at least one source element in the seismic source based at least in part on the plurality of estimated far field signatures to yield seismic data better indicative of the subterranean formation than the received seismic data set;

generate a seismic image based on the estimated notional source element signature and the data that is better indicative of the subterranean formation than the received seismic data set; and record the seismic image on the non-transitory machine-readable medium.

18. The medium of claim 17, comprising instructions to determine the estimated notional source element signature for the at least one source element in the seismic source based at least in part on the plurality of estimated far field signatures in addition to at least one measured far field signature.

19. The medium of claim 18, wherein a total number of estimated far field signatures in addition to the at least one measured far field signature is at least equal to a total number of source elements in the seismic source.

20. The medium of claim 17, comprising instructions to determine an estimated notional source element signature for each source element based at least in part on a matrix of homogeneous three-dimensional Green's functions for wave propagation from a known position of each of the plurality of source elements to each of the plurality of simulated far field measurement points.

21. The medium of claim 17, comprising instructions to determine a revised estimated far field signature for the seismic source in one of the plurality of other directions based on input of a notional source element signature for a plurality of the source elements in the seismic source.

22. A method of generating a geophysical data product, the method comprising:

obtaining geophysical data, comprising:

receiving, by a machine, a seismic data set measured by a receiver at a far field measurement point associated with a seismic source having a plurality of source elements particularly positioned in and relative to a geometric center of a source array, wherein the seismic data set is indicative of a subterranean formation;

processing the geophysical data to generate the geophysical data product, wherein processing the geophysical data comprises:

determining, by the machine, an impulse response in a first direction and an impulse response in a second direction of the seismic source using the seismic data set;

determining, by the machine, a transfer function that transforms a far field signature of the seismic source in the first direction to a far field signature of the seismic source in the second direction based on corresponding impulse responses in the first direction and the second direction and a particular geometry of the plurality of source elements;

determining, by the machine and based on the transfer function, an estimated far field signature at a simulated far field measurement point for the seismic source in the second direction to yield seismic data better indicative of the subterranean formation than the received seismic data set;

generating a seismic image based on the estimated far field signature and the data that is better indicative of the subterranean formation than the received seismic data set; and recording the seismic image on a non-transitory machine-readable medium.

23. The method of claim 22, further comprising recording the geophysical data product on a non-transitory machine-readable medium suitable for importing onshore.

24. The method of claim 22, wherein processing the geophysical data comprises processing the geophysical data offshore or onshore.

\* \* \* \* \*